United States Patent
Lin

(10) Patent No.: US 9,448,351 B2
(45) Date of Patent: Sep. 20, 2016

(54) REFLECTOR, ILLUMINATING DEVICE AND BACKLIGHT MODULE USING THE REFLECTOR

(71) Applicant: HON HAI PRECISION INDUSTRY CO., LTD., New Taipei (TW)

(72) Inventor: Chen-Han Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 40 days.

(21) Appl. No.: 14/466,540

(22) Filed: Aug. 22, 2014

(65) Prior Publication Data

US 2016/0047968 A1 Feb. 18, 2016

(30) Foreign Application Priority Data

Aug. 14, 2014 (TW) .............................. 103127993 A

(51) Int. Cl.
  *F21V 8/00* (2006.01)
  *F21K 99/00* (2016.01)

(52) U.S. Cl.
  CPC .................................. *G02B 6/0031* (2013.01)

(58) Field of Classification Search
  CPC .............................. G02B 6/002; G02B 6/0021
  See application file for complete search history.

(56) References Cited

U.S. PATENT DOCUMENTS

| | | | | |
|---|---|---|---|---|
| 5,786,665 | A * | 7/1998 | Ohtsuki | G02B 6/0021 313/113 |
| 6,481,130 | B1 * | 11/2002 | Wu | F21V 13/04 362/297 |
| 8,272,771 | B2 * | 9/2012 | Arai | G02B 6/0016 362/608 |
| 8,662,711 | B2 * | 3/2014 | Chen | F21V 7/0058 362/302 |
| 9,164,217 | B2 * | 10/2015 | Ito | F21V 7/0008 |
| 2010/0085772 | A1 * | 4/2010 | Song | G02B 6/0023 362/612 |

* cited by examiner

Primary Examiner — Elmito Breval
(74) Attorney, Agent, or Firm — Zhigang Ma

(57) ABSTRACT

A reflector configured for guiding light emitted from a light emitting diode (LED) light source includes four reflective walls. The reflective walls are connected side-by-side to cooperatively define a cavity. The cavity has a first opening and a second opening at opposite ends thereof. An inner diameter of the cavity gradually decrease as it extends from the second opening toward the first opening. The LED light source is located at the second opening of the cavity. Light emitted from the LED light source enters into the cavity and is reflected by the at least one reflective wall toward the first opening of the cavity. An illuminating device and a backlight module using the reflector are also provided.

11 Claims, 3 Drawing Sheets

REFLECTOR, ILLUMINATING DEVICE AND BACKLIGHT MODULE USING THE REFLECTOR

FIELD

The subject matter herein generally relates to a reflector, and an illuminating device and a backlight module using the reflector.

BACKGROUND

Light emitting diode (LED) is a solid state light emitting device made from semiconductors, which is more stable and reliable than other conventional light sources such as cold cathode fluorescent tubes that are generally employed in a conventional backlight module for illuminating a liquid crystal display (LCD) screens.

BRIEF DESCRIPTION OF THE DRAWINGS

Implementations of the present technology will now be described, by way of example only, with reference to the attached figures.

DETAILED DESCRIPTION

Figure 1:
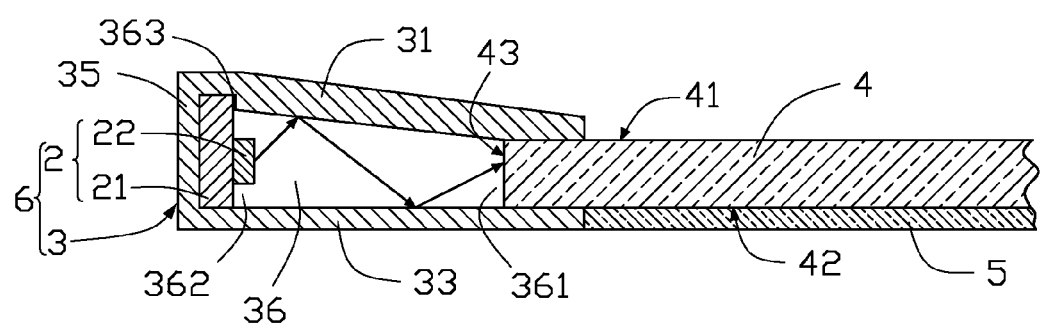
FIG. 1 is a cross-sectional view of a backlight module in accordance with an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or detachably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to relates to a reflector, and an illuminating device and a backlight module using the reflector.

Referring to FIG. 1, a backlight module 1 in accordance with an exemplary embodiment of the present disclosure is illustrated. The backlight module 1 includes a light guide plate 4, an illuminating device 6 located at a side of the light guide plate 4, and a reflective sheet 5 attached to a bottom of the light guide plate 4. The illuminating device 6 can include a light emitting diode (LED) light source 2, and a reflector 3 optically coupled to the LED light source 2. The reflector 3 is located between the LED light source 2 and the light guide plate 4. The reflector 3 is configured for optically coupling light emitted from the LED light source 2 into the light guide plate 4. The reflective sheet 5 is configured for reflecting light refracted out of the bottom of the light guide plate 4 back into the light guide plate 4.

Figure 2:
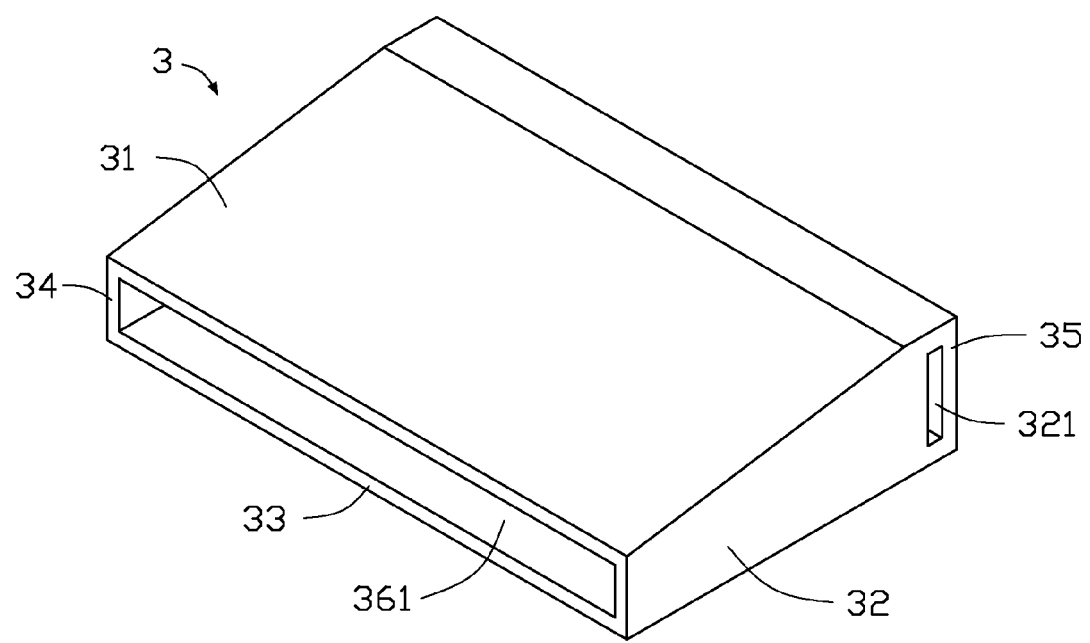
FIG. 2 is an isometric, prospective view of a reflector of the backlight module of FIG. 1 in accordance with a first embodiment of the present disclosure.

Referring to FIGS. 1 and 2, the reflector 3 has a substantially box-shaped configuration. The reflector 3 includes a first reflective wall 31, a second reflective wall 32, a third reflective wall 33, a fourth reflective wall 34, and a bottom plate 35 connected to the first, second, third, fourth reflective walls 31, 32, 33, 34. The first, second, third, fourth reflective walls 31, 32, 33, 34 are connected side-by-side to cooperatively form a cavity 36. The cavity 36 has a first opening 361 and a second opening 362 at opposite ends thereof. An inner diameter of the cavity 36 gradually decreases as it extends from the second opening 362 towards the first opening 361.

The first, second, third, fourth reflective walls 31, 32, 33, 34 each are an elongated plate-shaped member. The first reflective wall 31 faces the third reflective wall 33. The second reflective wall 32 faces the fourth reflective wall 34. The fourth reflective wall 34 interconnects one of two long sides of the first reflective wall 31 and one of two long sides of the third reflective wall 33, and the second reflective wall 32 interconnects the other one of two long sides of the first reflective wall 31 and the other one of two long sides of the third reflective wall 33. The second and fourth reflective wall 32, 34 are parallel to each other. The first reflective wall 31 is inclined to the third reflective wall 33. A distance between the first and third reflective walls 31, 33 gradually decreases along an extending direction of the cavity 36 from the second opening 362 to the first opening 361.

The bottom plate 35 covers the second opening 362 of the cavity 36. The bottom plate 35 and the first, second, third, fourth reflective walls 31, 32, 33, 34 cooperatively define a receiving recess 363 in the cavity 36 for accommodating the LED light source 2. The LED light source 2 is received in the receiving recess 363 and mounted on the bottom plate 35. A mounting hole 321 is defined on the second reflective wall 32 of the reflector 3. The mounting hole 321 extends through the second reflective wall 32 and communicates the receiving recess 363. The LED light source 2 includes a substrate 21 and a plurality of light emitting diodes 22 (only one light emitting diode 22 is shown in FIG. 1) arranged thereon. The substrate 21 can be slid into the receiving recess 363 via the mounting hole 321.

Alternatively, the bottom plate 35 could be omitted according to actual requirements. In detail, the substrate 21 of the LED light source 2 can be directly connected to the first, second, third, fourth reflective walls 31, 32, 33, 34 via fasteners or glue to cover the second opening 362 of the cavity 36.

Each light emitting diode 22 includes a blue light irradiating chip coated with a phosphor layer thereon so as to generate white light. Alternatively, the plurality of light emitting diodes 22 includes blue light irradiating chips, red light irradiating chips and green light irradiating chips arranged in a matrix, thereby generating a mixed white light in the cavity 36. Alternatively, the substrate 21 of the LED light source 2 can be omitted according to actual requirements. In detail, the plurality of light emitting diodes 22 can be directly arranged on the bottom plate 35 and electrically connected to an external power (not shown) via wires which extend through the mounting hole 321. In addition, an inner surface of the bottom plate 35 can be coated with a reflective film to reflect light toward the first opening 361 of the cavity 36.

The light guide plate 4 can be substantially rectangular. The light guide plate 4 includes a light exit face 41, a bottom face 42 opposite to the light exit face 41, and a light incident face 43 interconnecting the light exit face 41 and the bottom face 42. The light incident face 43 of the light guide plate 4 faces the first opening 361 of the cavity 36. One end of the light guide plate 4 adjacent to the light incident face 43 is inserted into the first opening 361 of the cavity 36. The reflective sheet 5 is attached to the bottom face 42 of the light guide plate 4. The reflective sheet 5 is coplanar with the third reflective wall 33 of the reflector 3.

When a forward bias voltage is applied to the LED light source 6, light emitted from the LED light source 2 enters into the cavity 36 and is reflected by the first, second, third, fourth reflective walls 31, 32, 33, 34 toward the light guide plate 4, and then light enters into the light guide plate 4.

In at least one embodiment, light emitted from the LED light source 2 is collected and converged by the reflector 3 to project on the light incident face 43 of the light guide plate 4. In particular, a part of light having a large illuminating angle with respect to an optical axis of corresponding light emitting diodes 22 is reflected by the reflector 3, so as to optically couple into the light guide plate 4. In addition, light emitted from the LED light source 2 is reflected many times by the first, second, third, fourth reflective walls 31, 32, 33, 34, thereby generating a uniform light distribution in the cavity 36.

Figure 3:
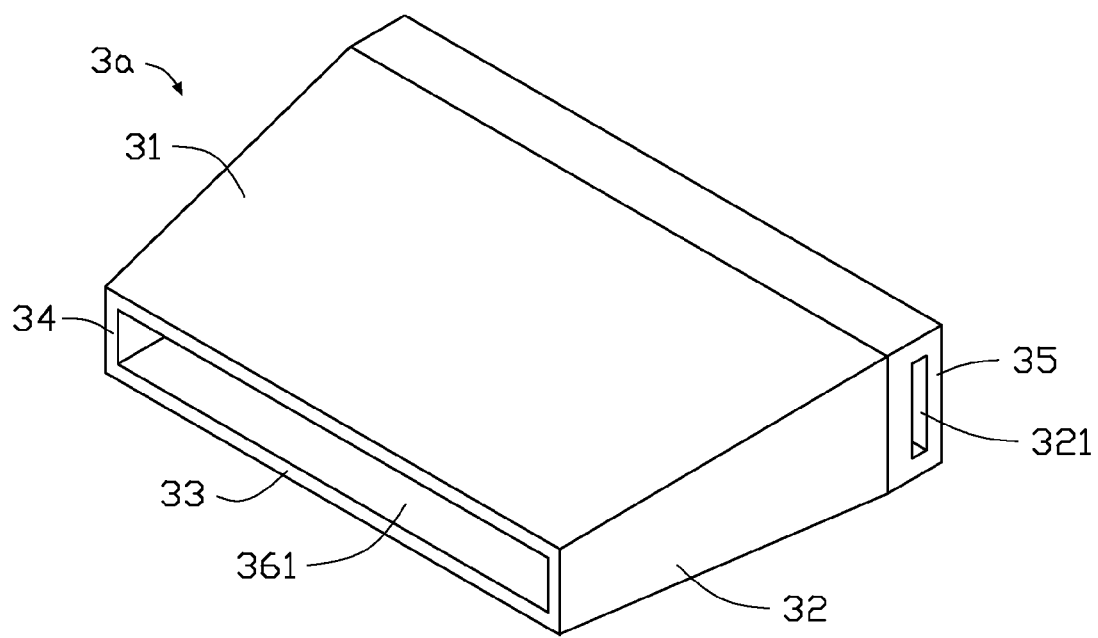
FIG. 3 is an isometric, prospective view of a reflector of the backlight module of FIG. 1 in accordance with a second embodiment of the present disclosure.

Referring to FIG. 3, a reflector 3a in accordance with a second embodiment of the present disclose is illustrated. Different from the reflector 3 shown in FIG. 2, the second reflective wall 32 of the reflector 3a in FIG. 3 is inclined to the fourth reflective wall 34, and a distance between the second and fourth reflective walls 32, 34 gradually decrease along extending direction of the cavity 36 from the second opening 362 to the first opening 361.

It is also practicable that the reflector 3, 3a can includes one cone-shaped reflective wall 31 only, and the cavity 36 is surrounded by the reflective wall 311. Alternatively, the reflector 3, 3a can includes a first reflective wall 31, a second reflective wall 32, and a third reflective wall 33, and the first, second, third reflective walls 31, 32, 33 are connected side-by-side to cooperatively form the cavity 36 having a triangle cross section.

It is believed that the present embodiments and their advantages will be understood from the foregoing description, and it will be apparent that various changes may be made thereto without departing from the scope of the disclosure or sacrificing all of its material advantages, the examples hereinbefore described merely being preferred or exemplary embodiments.

What is claimed is:

1. A reflector configured for guiding light emitted from a light emitting diode (LED) light source, comprising:
  at least one reflective wall; and
  a cavity surrounded by the least one reflective wall, the cavity comprising a first opening and a second opening at opposite ends thereof;
  wherein an inner diameter of the cavity gradually decreases as it extends from the second opening toward the first opening;
  wherein the LED light source is located at the second opening of the cavity, and light emitted from the LED light source enters into the cavity and is reflected by the at least one reflective wall toward the first opening of the cavity; and
  wherein the reflective walls comprise a first reflective wall, a second reflective wall, a third reflective wall and a fourth reflective wall, the first reflective wall is inclined to the third reflective wall, and a distance between the first and third reflective walls gradually decreases along an extending direction of the cavity from the second opening to the first opening, the fourth reflective wall opposite to the second reflective wall, the second reflective wall is inclined to the fourth reflective wall, and a distance between the second and fourth reflective walls gradually decreases along the extending direction of the cavity from the second opening to the first opening.

2. The reflector of claim 1, wherein each reflective wall is an elongated plate-shaped member, and the reflective walls are connected side-by-side to cooperatively define the cavity.

3. The reflector of claim 1, wherein the fourth reflective wall interconnects one of two long sides of the first reflective wall and one of two long sides of the third reflective wall, and the second reflective wall interconnects the other one of two long sides of the first reflective wall and the other one of two long sides of the third reflective wall.

4. The reflector of claim 2 further comprising a bottom plate covering the second opening, wherein the bottom plate and the reflective walls cooperatively define a receiving recess in the cavity for accommodating the LED light source, and the LED light source is received in the receiving recess and mounted on the bottom plate.

5. The reflector of claim 4 further comprising a mounting hole defined in one of the reflective walls, wherein the mounting hole extends through the reflective wall and communicates the receiving recess, the LED light source comprising a substrate and a plurality of light emitting diodes arranged thereon, and the substrate is capable of sliding into the receiving recess via the mounting hole.

6. An illuminating device, comprising:
  a light emitting diode (LED) light source; and
  a reflector optically coupled to the LED light source for guiding light emitted from the LED light source, the reflector comprising at least one reflective wall and a cavity surrounded by the least one reflective wall;
  wherein the cavity comprises a first opening and a second opening at opposite ends thereof, and an inner diameter of the cavity gradually decrease as it extends from the second opening toward the first opening;
  wherein the LED light source is located at the second opening of the cavity, and light emitted from the LED light source enters into the cavity and is reflected by the at least one reflective wall toward the first opening of the cavity; and
  wherein the reflective walls comprise a first reflective wall, a second reflective wall, a third reflective wall and a fourth reflective wall, the first reflective wall is inclined to the third reflective wall, and a distance between the first and third reflective walls gradually decreases along an extending direction of the cavity from the second opening to the first opening, the fourth reflective wall opposite to the second reflective wall, the second reflective wall is inclined to the fourth reflective wall, and a distance between the second and fourth reflective walls gradually decreases along the extending direction of the cavity from the second opening to the first opening.

7. The illuminating device of claim 6, wherein each reflective wall is an elongated plate-shaped member, and the reflective walls are connected side-by-side to cooperatively define the cavity.

8. The illuminating device of claim 6, wherein the fourth reflective wall interconnects one of two long sides of the first reflective wall and one of two long sides of the third reflective wall, and the second reflective wall interconnects the other one of two long sides of the first reflective wall and the other one of two long sides of the third reflective wall.

9. A backlight module, comprising:
   a light emitting diode (LED) light source;
   a light guide plate optically coupled to the LED light source, the light guide plate comprising a light exit face, a bottom face opposite the light exit face, and a light incident face interconnecting the bottom face and the light exit face; and
   a reflector located between the LED light source and the light guide plate, the reflector being configured for optically coupling light emitted from the LED light source into the light guide plate, the reflector comprising at least one reflective wall and a cavity surrounded by the least one reflective wall;
   wherein the cavity comprises a first opening and a second opening at opposite ends thereof, and an inner diameter of the cavity gradually decreases as it extends from the second opening toward the first opening;
   wherein the LED light source is located at the second opening of the cavity, the light guide plate is located at the first opening of the cavity, light emitted from the LED light source enters into the cavity and is reflected by the at least one reflective toward the light incident face of the light guide plate; and
   wherein the reflective walls comprise a first reflective wall, a second reflective wall, a third reflective wall and a fourth reflective wall, the first reflective wall is inclined to the third reflective wall, and a distance between the first and third reflective walls gradually decreases along an extending direction of the cavity from the second opening to the first opening, the fourth reflective wall opposite to the second reflective wall, the second reflective wall is inclined to the fourth reflective wall, and a distance between the second and fourth reflective walls gradually decreases along the extending direction of the cavity from the second opening to the first opening.

10. The backlight module of claim 9, wherein each reflective wall is an elongated plate-shaped member, and the reflective walls are connected side-by-side to cooperatively define the cavity.

11. The backlight module of claim 9, wherein the fourth reflective wall interconnects one of two long sides of the first reflective wall and one of two long sides of the third reflective wall, and the second reflective wall interconnects the other one of two long sides of the first reflective wall and the other one of two long sides of the third reflective wall.

* * * * *